US012126110B2

(12) United States Patent
Yamanaka

(10) Patent No.: US 12,126,110 B2
(45) Date of Patent: Oct. 22, 2024

(54) CONNECTOR CAPABLE OF WATERPROOFING A DETECTOR PORTION

(71) Applicant: SUMITOMO WIRING SYSTEMS, LTD., Mie (JP)

(72) Inventor: Takuya Yamanaka, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 343 days.

(21) Appl. No.: 17/691,417

(22) Filed: Mar. 10, 2022

(65) Prior Publication Data

US 2022/0302625 A1 Sep. 22, 2022

(30) Foreign Application Priority Data

Mar. 16, 2021 (JP) ................................ 2021-041996

(51) Int. Cl.

| | |
|---|---|
| ***H01R 13/436*** | (2006.01) |
| ***H01R 13/502*** | (2006.01) |
| ***H01R 13/52*** | (2006.01) |
| ***H01R 13/629*** | (2006.01) |

(52) U.S. Cl.

CPC ....... *H01R 13/4368* (2013.01); *H01R 13/502* (2013.01); *H01R 13/521* (2013.01); *H01R 13/62933* (2013.01)

(58) Field of Classification Search

CPC .......... H01R 13/62938; H01R 13/6295; H01R 13/521; H01R 13/5219; H01R 13/5221; H01R 13/62933; H01R 13/62944; H01R 13/62961; H01R 13/62977

See application file for complete search history.

(56) References Cited

U.S. PATENT DOCUMENTS

| | | | | |
|---|---|---|---|---|
| 6,755,673 B2 * | 6/2004 | Fukushima | ...... | H01R 13/62938 439/372 |
| 7,625,225 B2 * | 12/2009 | Mori | ................ | H01R 13/62938 439/157 |
| 9,325,112 B2 * | 4/2016 | Tabata | ............. | H01R 13/62966 |
| 2014/0364010 A1 * | 12/2014 | Kuwahara | ............... | B60L 53/16 439/626 |
| 2015/0140847 A1 | 5/2015 | Kanemura | | |
| 2019/0109413 A1 | 4/2019 | Oishi et al. | | |

FOREIGN PATENT DOCUMENTS

| | | |
|---|---|---|
| EP | 3591769 A1 | 1/2020 |
| JP | H09-106852 A | 4/1997 |
| JP | H11-074025 A | 3/1999 |

* cited by examiner

*Primary Examiner* — Renee S Luebke
*Assistant Examiner* — Paul D Baillargeon
(74) *Attorney, Agent, or Firm* — Venjuris, P.C.

(57) ABSTRACT

A connector 10 includes a connector body 20, a lever 90 rotatably supported on the connector body 20 and configured to properly connect the connector body 20 and a mating connector body 120 at a connection position, a detector portion 60 separate from the connector body 20 and to be fit to a mating detector portion 160 when the lever 90 is at the connection position, and a detection-side sealing portion 80 to be liquid-tightly arranged between the detector portion 60 and the mating detector portion 160. The detector portion 60 and the lever 90 include movement converting portions for converting a rotational movement of the lever 90 into a linear movement of the detector portion 60 with respect to the mating detector portion 120 by contacting each other.

3 Claims, 8 Drawing Sheets

CONNECTOR CAPABLE OF WATERPROOFING A DETECTOR PORTION

CROSS-REFERENCE TO RELATED APPLICATIONS

This application is based on and claims priority from Japanese Patent Application No. 2021-041996, filed on Mar. 16, 2021, with the Japan Patent Office, the disclosure of which is incorporated herein in their entireties by reference.

TECHNICAL FIELD

The present disclosure relates to a connector.

BACKGROUND

A connector disclosed in Japanese Patent Laid-open Publication No. 2018-006303 includes a first housing and a second housing connectable to each other, a lock arm provided on the first housing and first terminals to be accommodated into the first housing. The lock arm locks the second housing and holds the first and second housings in a connected state. When the first and second housings are properly connected, the first terminals interlocked with the lock arm are connected to second terminals of the second housing. In this way, it can be detected that the first and second housings have been properly connected.

In the case of Japanese Patent Laid-open Publication No. 2018-006303, a waterproof structure is not provided around the first and second terminals. Thus, the reliability of connection detection may lack. In contrast, a technique provided with a waterproof structure around connection detection terminals such as the first and second terminals is disclosed in Japanese Patent Laid-open Publication Nos. H09-106852, H11-074025, 2015-099684 and 2020-009528.

SUMMARY

A lever-type connector is known in which connectors are connected based on a rotational movement of a lever. In this case, it is thought to fit a detector portion for connection detection interlocked with the lever to a mating detector portion and waterproof between the detector portion and the mating detector portion. However, since a movement of fitting the detector portion to the mating detector portion for waterproofing is a linear movement parallel to a connecting direction, it is difficult to interlock this movement with the rotational movement of the lever.

Accordingly, the present disclosure aims to provide a connector capable of waterproofing a detector portion interlocked with a lever.

The present disclosure is directed to a connector with a connector body connectable to a mating connector body, a lever rotatably supported on the connector body, the lever properly connecting the connector body and the mating connector body at a connection position, a detector portion separate from the connector body, the detector portion being fit to a mating detector portion when the lever is at the connection position, and a detection-side sealing portion to be liquid-tightly arranged between the detector portion and the mating detector portion, the detector portion and the lever including movement converting portions for converting a rotational movement of the lever into a linear movement of the detector portion with respect to the mating detector portion by contacting each other.

According to the present disclosure, it is possible to provide a connector capable of waterproofing a detector portion interlocked with a lever.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
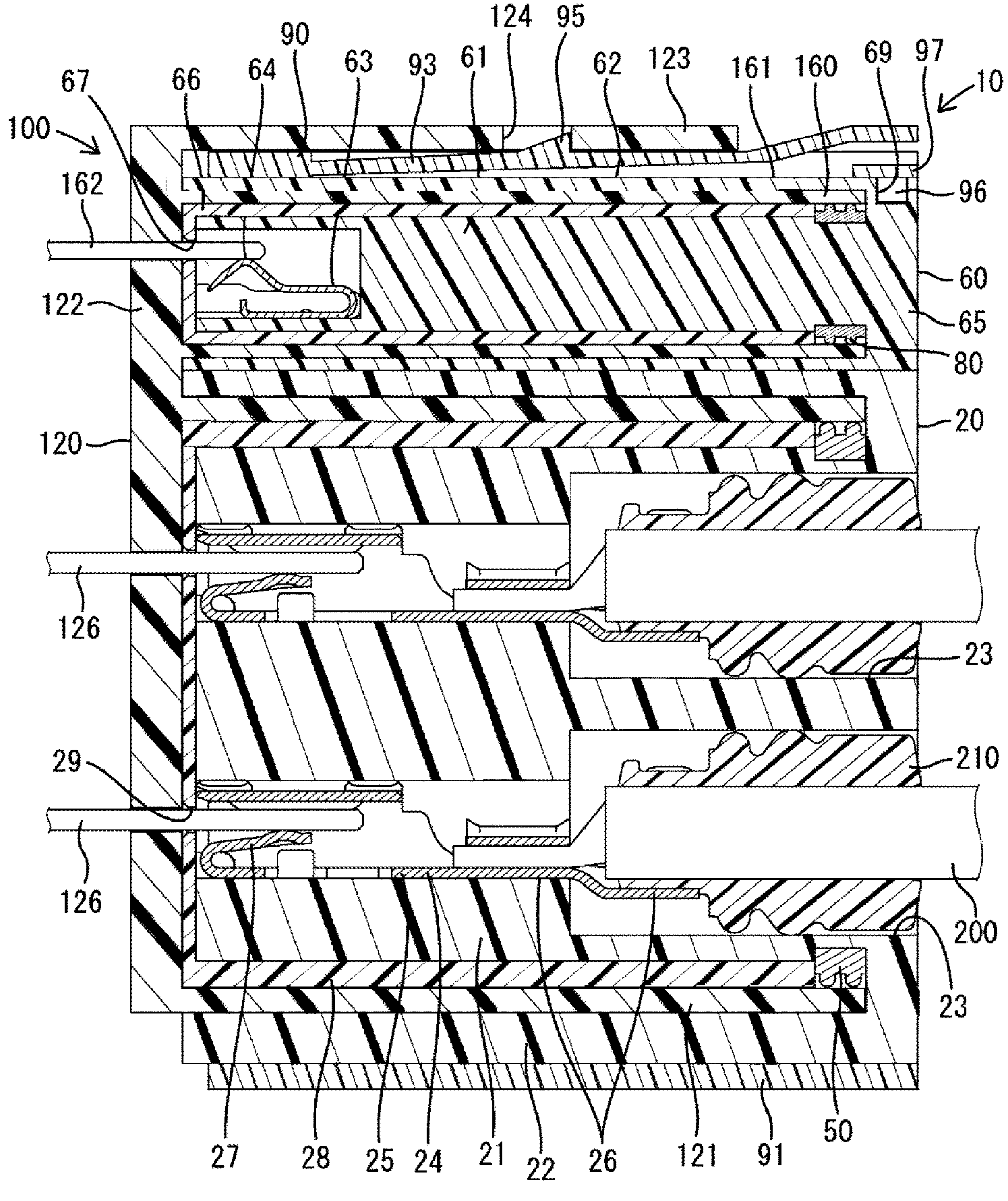
FIG. 1 is a side view in section of a connector according to an embodiment when a lever is at a connection position.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

[Description of Embodiments of Present Disclosure]

First, embodiments of the present disclosure are listed and described.

(1) The connector of the present disclosure includes a connector body connectable to a mating connector body, a lever rotatably supported on the connector body, the lever properly connecting the connector body and the mating connector body at a connection position, a detector portion separate from the connector body, the detector portion being fit to a mating detector portion when the lever is at the connection position, and a detection-side sealing portion to be liquid-tightly arranged between the detector portion and the mating detector portion, the detector portion and the lever including movement converting portions for converting a rotational movement of the lever into a linear movement of the detector portion with respect to the mating detector portion by contacting each other.

Since the detector portion is fit to the mating detector portion when the lever is at the connection position, it can be judged that the connector body and the mating connector body are in a properly connected state by electrically or mechanically detecting that state. In this connector, the detector portion and the mating detector portion can be waterproofed by the detection-side sealing portion. Since the movement converting portions convert the rotational movement of the lever into the linear movement of the detector portion with respect to the mating detector portion, the detector portion can be suitably fit to the mating detector portion.

(2) Preferably, the movement converting portions are provided on a pressing portion provided on the lever and the detector portion and include a contact surface to be pressed toward the mating detector portion by the pressing portion. According to this, a movement conversion can be realized by a simple configuration composed of the pressing portion and the contact surface.

(3) Preferably, a body-side sealing portion to be liquid-tightly arranged between the connector body and the mating connector body may be provided separately from the detection-side sealing portion. According to this, liquid-tight sealing is provided between the connector body and the mating connector body via the body-side sealing portion. Since the detection-side sealing portion and the body-side sealing portion are arranged around each of the detector portion and the connector body, the entire connector can be waterproofed.

[Details of Embodiment of Present Disclosure]

A specific example of the present disclosure is described below with reference to the drawings. Note that the present invention is not limited to this illustration and is intended to be represented by claims and include all changes in the scope of claims and in the meaning and scope of equivalents.

A connector 10 according to an embodiment includes a connector body 20, a body-side sealing portion 50, a detector portion 60, a detection-side sealing portion 80 and a lever 90 as shown in FIG. 1. The connector body 20 and the detector portion 60 are separate from each other, but are relatively displaceably coupled via the lever 90. The connector body 20 and the detector portion 60 are connectable to a mating connector 100.

Note that, in the following description, a front-rear direction corresponds to a connecting direction of the connector 10 and the mating connector 100. Surface sides of the connector 10 and the mating connector 100 facing each other when connection is started are front sides. A vertical direction is based on a vertical direction of each figure except FIGS. 2 and 3. A lateral direction is a direction orthogonal to the plane of FIG. 1 and is a vertical direction of FIG. 2. The vertical direction is synonymous with a height direction, and the lateral direction is synonymous with a width direction. In FIGS. 5 to 8, "X" denotes a front side, and "Y" denotes a left side and "Z" denotes an upper side when viewed from front. The respective directions are directions for the convenience of description and do not limit directions at the time of assembling and usage. Further, in each figure, components, which are low in relevance to the content of the present disclosure, are omitted or shown in a simplified manner.

<Mating Connector>

Figure 4:
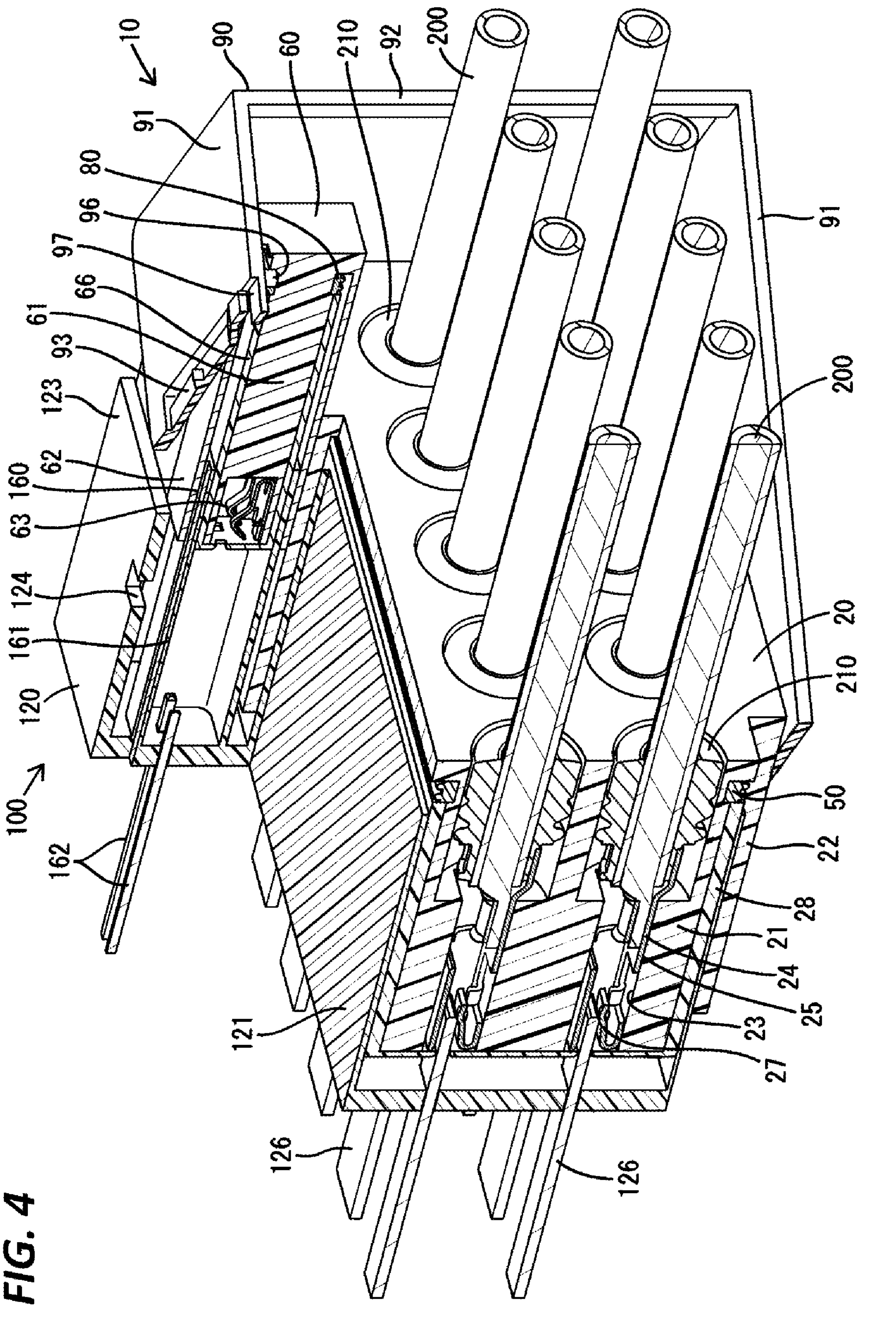
FIG. 4 is a perspective view partly in section showing a connected state of a detector portion and a mating detector portion and a connected state of a connector body and a mating connector body when the lever is at the initial position.
Figure 5:
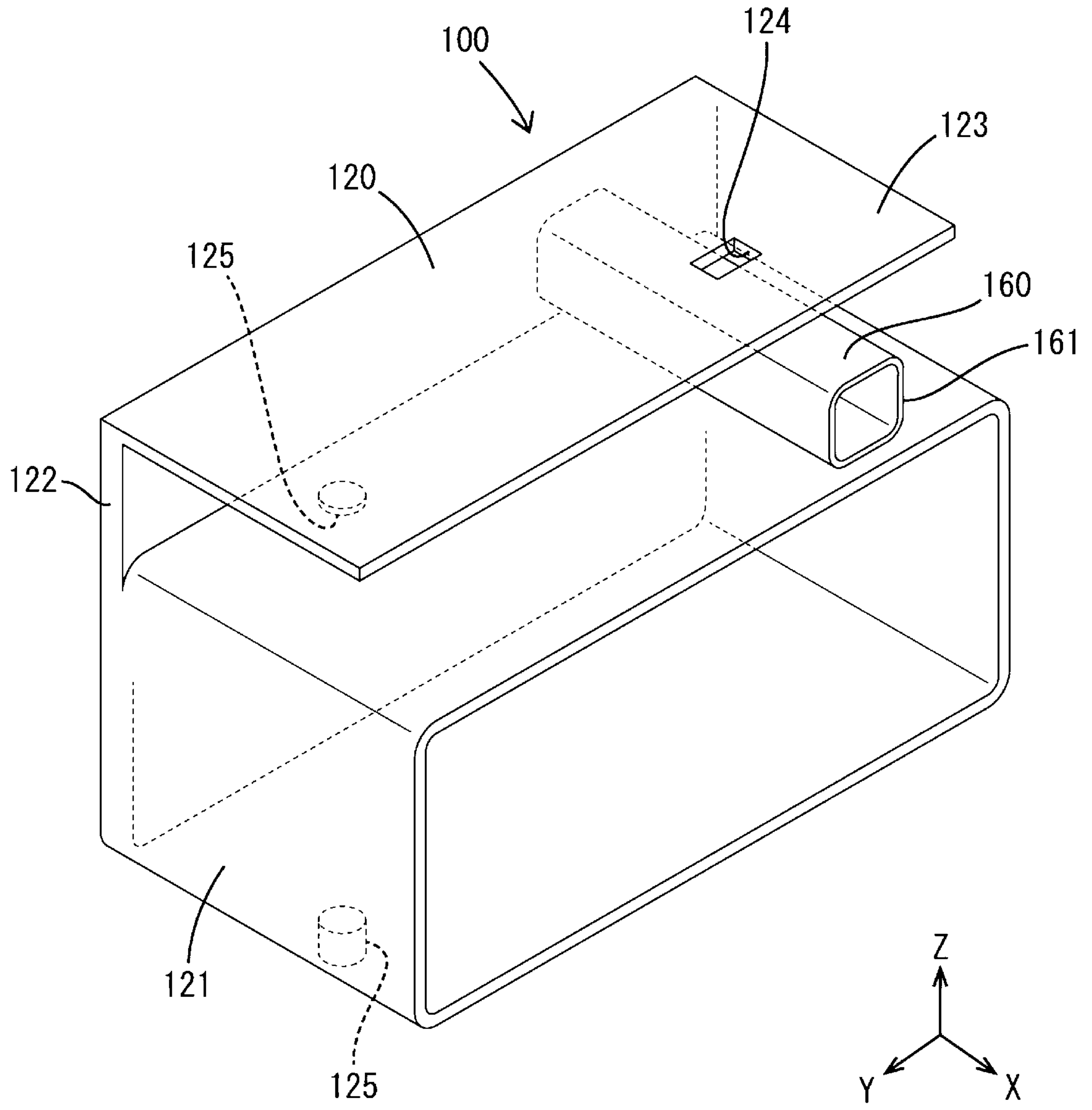
FIG. 5 is a perspective view of a mating connector.

As shown in FIG. 5, the mating connector 100 includes a mating connector body 120 and a mating detector portion 160. The mating connector body 120 includes a receptacle 121 in the form of a rectangular tube. The receptacle 121 is open forward. As shown in FIGS. 1 and 4, a plurality of male mating terminals 126 are provided to project into the receptacle 121.

As shown in FIG. 5, the mating connector body 120 includes a back plate portion 122 rising from the rear end of the upper surface of the receptacle 121 and a ceiling plate portion 123 projecting forward from the upper end of the back plate portion 122. The ceiling plate portion 123 is arranged to face the upper surface of the receptacle 121 while being spaced apart therefrom in the vertical direction. A lock hole 124 penetrates through one lateral side (right side of FIG. 5) of the ceiling plate portion 123. Further, a pin-shaped cam follower 125 projects on an end part on the other lateral side (left side of FIG. 5) of the ceiling plate portion 123. The tip of the cam follower 125 is facing the upper surface of the receptacle 121. A cam follower 125 coaxially arranged at a distance from the above cam follower 125 projects also on the lower surface of the receptacle 121.

The mating detector portion 160 is provided to project forward from the back plate portion 122. Further, the mating detector portion 160 is arranged on one lateral side facing the lock hole 124 of the ceiling plate portion 123 between the upper surface of the receptacle 121 and the ceiling plate portion 123. The mating detector portion 160 includes a mating detector body 161 in the form of a rectangular tube open forward. As shown in FIG. 4, a pair of male mating detection terminals 162 are provided to project into the mating detector body 161.

Note that the receptacle 121, the back plate portion 122, the ceiling plate portion 123 and the mating detector body 161 are made of synthetic resin and integrally and continuously formed as described above. The mating terminals 126 and the mating detection terminals 162 are made of conductive metal.

<Connector Body>

Figure 6:
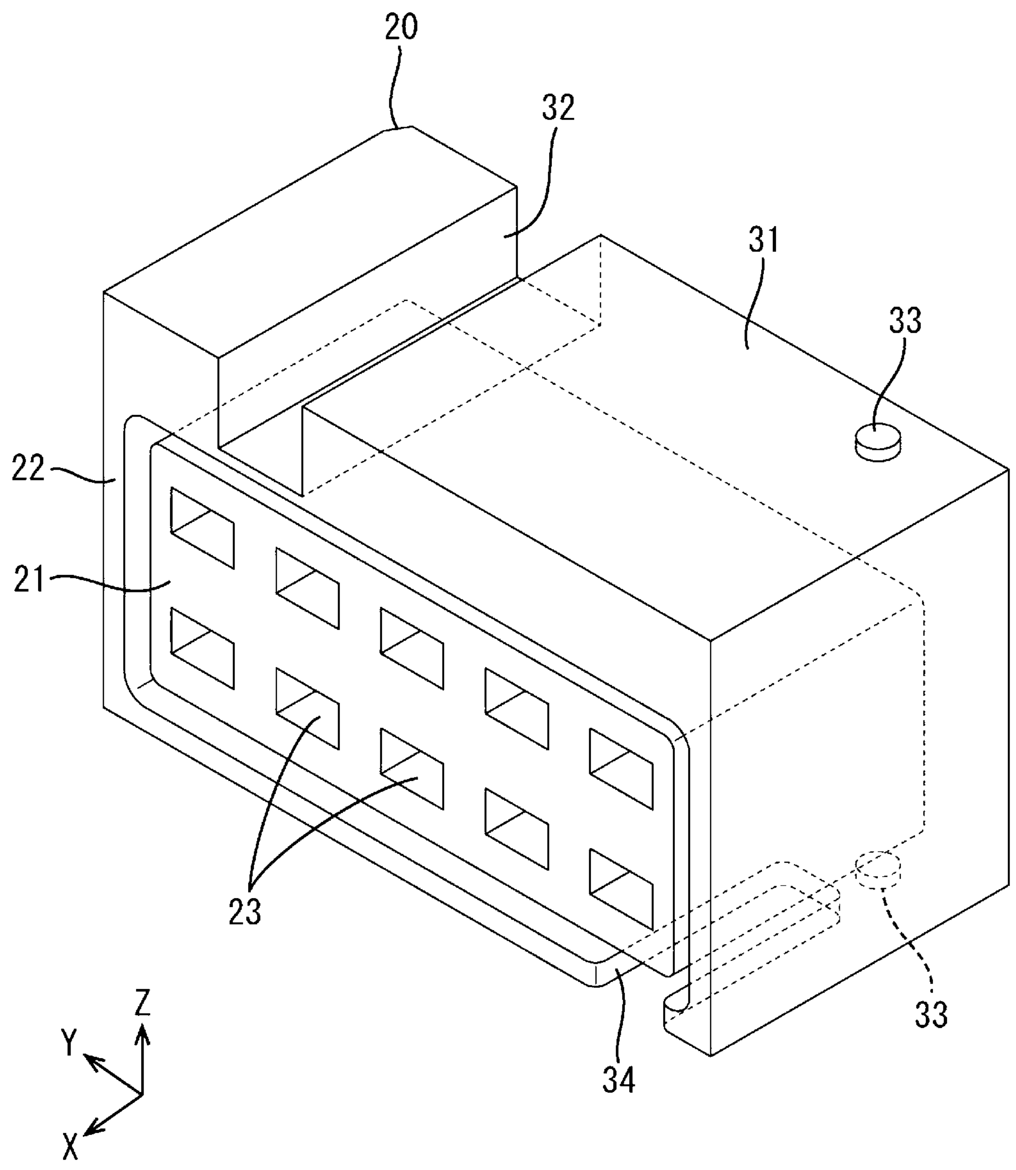
FIG. 6 is a perspective view of the connector body.

As shown in FIG. 6, the connector body 20 integrally includes a terminal accommodating portion 21 and a fitting portion 22 surrounding the outer periphery of the terminal accommodating portion 21. The terminal accommodating portion 21 and the fitting portion 22 are made of synthetic resin. As shown in FIGS. 1 and 4, the terminal accommodating portion 21 is fit into the receptacle 121. The terminal accommodating portion 21 includes a plurality of cavities 23 at positions corresponding to the respective mating terminals 126. The terminal fitting 24 is inserted into each cavity 23 from behind.

The terminal fitting 24 is made of conductive metal and, as shown in FIG. 1, shaped to extend in the front-rear direction. The terminal fitting 24 includes a tubular connecting portion 25 and a barrel portion 26 in the form of an open barrel arranged behind the connecting portion 25. The mating terminal 126 is inserted into the connecting portion 25. The mating terminal 126 contacts a resilient contact piece 27 in the connecting portion 25 and is electrically connected to the terminal fitting 24. The barrel portion 26 is connected to an end part of a wire 200. A rubber plug 210 is fit on the outer peripheral surface of the wire 200. The barrel portion 26 includes a part to be crimped to the rubber plug 210. The rubber plug 210 is liquid-tightly inserted into the cavity 23.

A body-side front holder 28 is mounted on the terminal accommodating portion 21 from front. The body-side front holder 28 is cap-shaped and arranged to cover a part from the front surface to the outer peripheral surface of the terminal accommodating portion 21. The front wall of the body-side front holder 28 is provided with body-side insertion holes 29 communicating with the respective cavities 23. The mating terminal 126 is connected to the terminal fitting 24 while being inserted through the body-side insertion hole 29.

As shown in FIG. 6, the fitting portion 22 is in the form of a rectangular tube and includes a function wall 31 in an upper wall located above the terminal accommodating portion 21. The function wall 31 includes a guide portion 32 for guiding a movement of the detector portion 60 and a supporting portion 33 for supporting the lever 90. The function wall 31 has a flat upper surface contactably facing a later-described arm portion 91 of the lever 90.

The guide portion 32 is provided by recessing one widthwise side (left side of FIG. 6) on the upper surface of the function wall 31. The guide portion 32 is a groove having a concave cross-section and extends in the front-rear direction, the front end thereof is open in the front surface of the function wall 31 and the rear end thereof is open in the rear surface of the function wall 31. The supporting portion 33 is in the form of a cylinder projecting on the other widthwise side (right side of FIG. 6) on the upper surface of the function wall 31. A supporting portion 33 coaxially arranged at a distance from the above supporting portion 33 projects on the lower surface of the lower wall of the fitting portion 22. Further, an escaping groove 34 is provided in the lower wall of the fitting portion 22. The escaping groove 34 extends in the front-rear direction and the front end thereof is open in the front surface of the lower wall of the fitting portion 22.

<Body-Side Sealing Portion>

The body-side sealing portion 50 is a sealing ring made of rubber. As shown in FIGS. 1 and 4, the body-side sealing portion 50 is fit on the outer peripheral surface of the terminal accommodating portion 21. With the terminal accommodating portion 21 fit in the receptacle 121, the body-side sealing portion 50 is in close contact with the inner peripheral surface of the receptacle 121. The peripheral wall of the body-side front holder 28 is arranged to face the front end of the body-side sealing portion 50. In this way, the body-side sealing portion 50 is restricted from coming out forward.

<Detector Portion>

Figure 7:
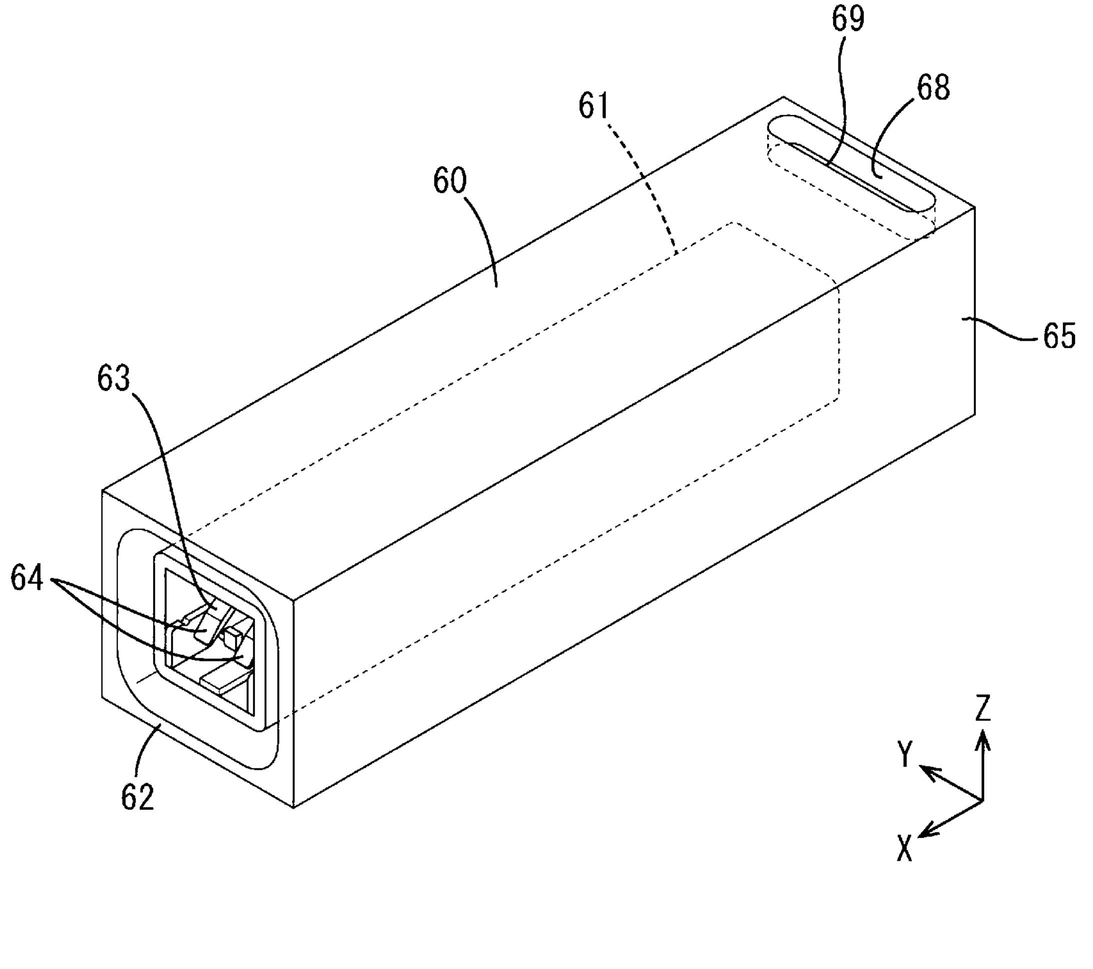
FIG. 7 is a perspective view of the detector portion.

As shown in FIG. 7, the detector portion 61 integrally includes a mounting portion 61 and a tubular portion 62 surrounding the outer periphery of the mounting portion 61. The mounting portion 61 and the tubular portion 62 are made of synthetic resin. A detection terminal 63 is held in the mounting portion 61.

The detection terminal 63 is made of conductive metal and also called a shorting terminal. The detection terminal 63 includes a pair of contact pieces 64 in a front part. The respective contact pieces 64 are resiliently deformable and formed integrally with each other.

The mounting portion 61 has an outer peripheral surface extending in the front-rear direction and having a rectangular cross-section. The tubular portion 62 is likewise shaped to extend in the front-rear direction and have a rectangular cross-section. The tubular portion 62 and the mounting portion 61 are coupled via a base end portion 65 arranged between the rear ends thereof. The base end portion 65 has an outer peripheral surface continuous with the tubular portion 62 and having a rectangular cross-section.

As shown in FIG. 1, a detection-side front holder 66 is mounted on the mounting portion 61 from front. The detection-side front holder 66 is cap-shaped and arranged to cover a part from the front surface to the outer peripheral surface of the mounting portion 61. The front wall of the detection-side front holder 66 is provided with detection-side insertion holes 67 at positions facing the respective contact pieces 64. The mating detection terminals 162 are connected to the detection terminal 63 while being inserted through the detection-side insertion holes 67.

Figure 3:
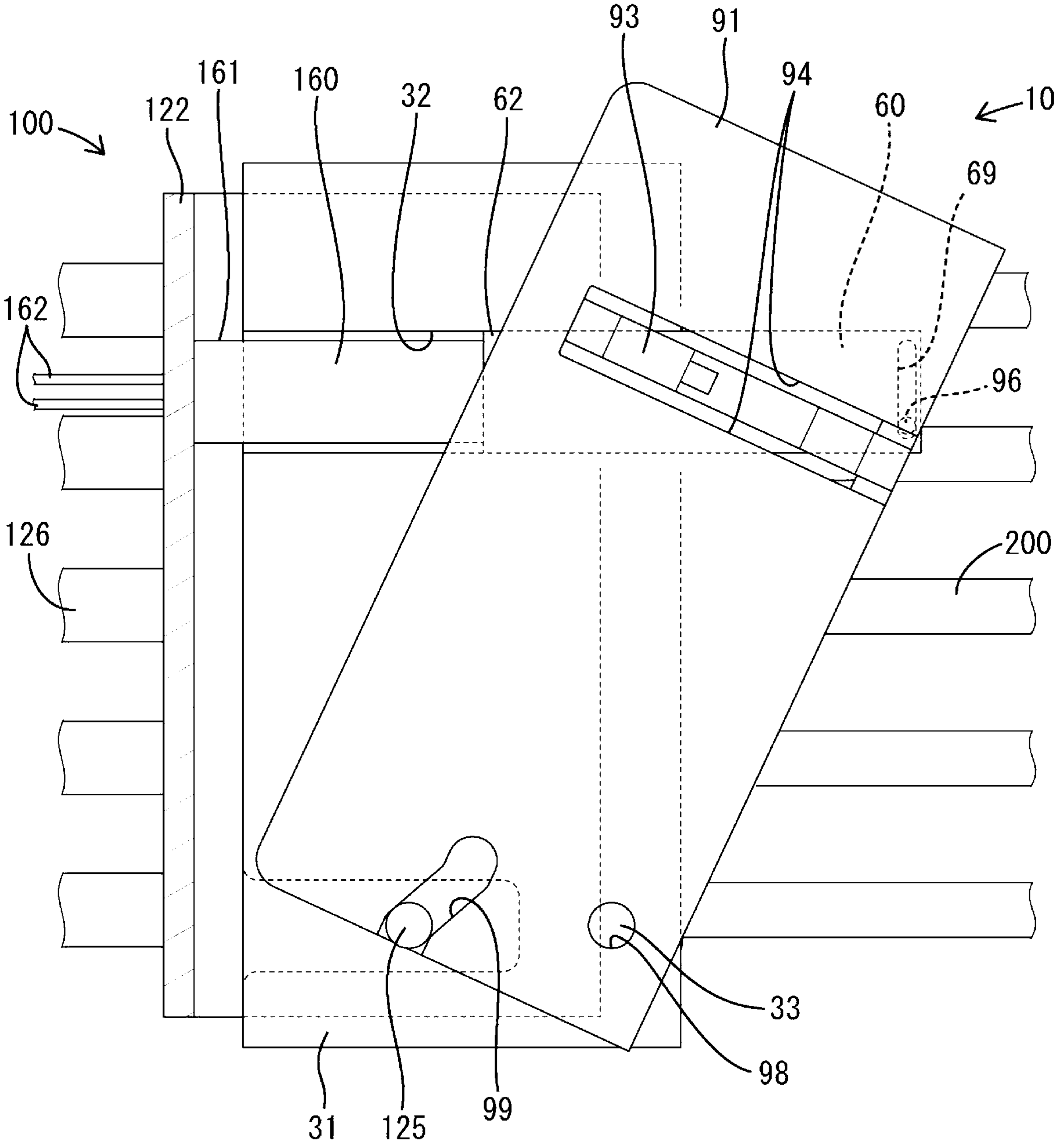
FIG. 3 is a top view partly in section when the lever is an initial position.

As shown in FIG. 3, the tubular portion 62 is inserted into the guide portion 32. Both side surfaces of the tubular portion 62 are arranged to contactably face the both side surfaces of the guide portion 32. The upper surface of the tubular portion 62 is arranged to be continuous with the upper surface of the function wall 31 without any step.

As shown in FIG. 7, a groove portion 68 is provided on a rear end side of the detector portion 60. The groove portion 68 is provided by recessing the upper surface of the base end portion 65. The groove portion 68 extends in the lateral direction and both ends thereof are closed near both side surfaces of the base end portion 65. The groove portion 68 has a contact surface 69 extending in the lateral direction on a front surface facing rearward. The contact surface 69 is pressed into contact with a later-described pressing portion 96 of the lever 90. The mating detector body 161 is fit and inserted between the mounting portion 61 and the tubular portion 62.

<Detection-Side Sealing Portion>

The detection-side sealing portion 80 is a sealing ring made of rubber. As shown in FIGS. 1 and 4, the detection-side sealing portion 80 is fit on the outer peripheral surface of the mounting portion 61. With the mating detector body 161 fit in the tubular portion 62, the detection-side sealing portion 80 is in close contact with the inner peripheral surface of the mating detector body 161. The peripheral wall of the detection-side front holder 66 is arranged to face the front end of the detection-side sealing portion 80. In this way, the detection-side sealing portion 80 is restricted from coming out forward.

<Lever>

Figure 8:
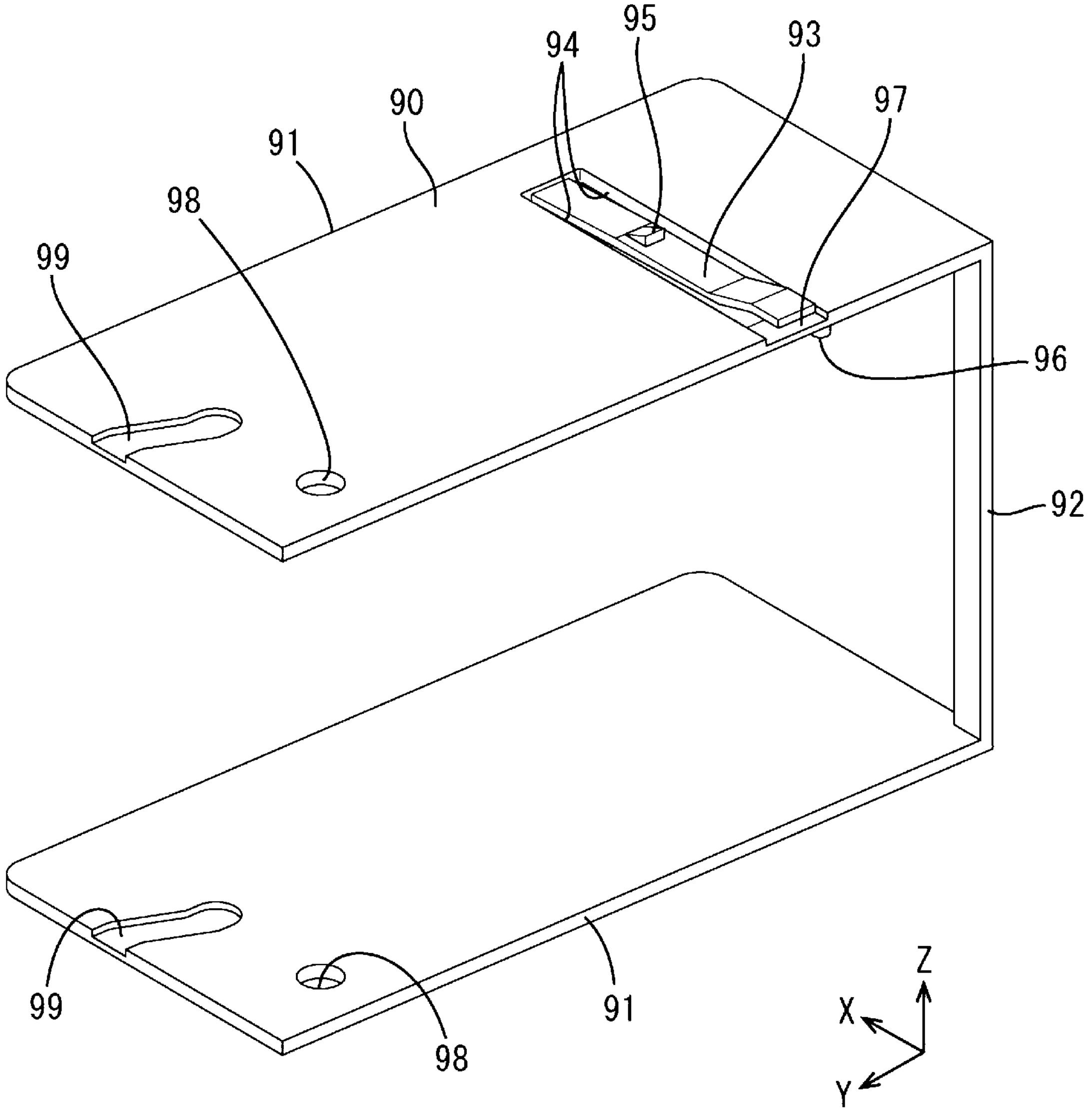
FIG. 8 is a perspective view of the lever.

The lever 90 is made of synthetic resin. As shown in FIG. 8, the lever 90 is in the form of a gate-shaped plate and includes a pair of arm portions 91 and a coupling portion 92 coupling one ends of the respective arm portions 91. The respective arm portions 91 are arranged in parallel to each other with plate surfaces facing upward and downward. The coupling portion 92 is shaped to extend in the vertical direction.

Out of the arm portions 91, the upper arm portion 91 includes a lock portion 93 on one widthwise side (right side of FIG. 8) near the coupling portion 92. The lock portion 93 is resiliently deformably provided between a pair of slits 94 extending in the front-rear direction on the one widthwise side of the arm portion 91. The lock portion 93 is provided with a lock projection 95 projecting upward. The lock projection 95 is fit and locked into the lock hole 124 of the mating connector body 120.

Further, the upper arm portion 91 includes the pressing portion 96 near the lock portion 93. The pressing portion 96 is in the form of a pin, more particularly in the form of a cylinder projecting downward from a bridge wall 97 extending between the respective slits 24 in a rear end part of the arm portion 91. The bridge wall 97 is arranged below a free end side (rear end side) of the lock portion 93.

A pair of shaft holes 98 penetrate through end parts of the respective arm portions 91 on the other widthwise side (left side of FIG. 8). The respective supporting portions 33 of the connector body 20 are fit into the respective shaft holes 98. The respective arm portions 91 include a pair of cam grooves 99 near the shaft holes 98 in the end parts on the other widthwise side. The cam groove 99 is provided by recessing the upper surface of each arm portion 91 and open in the other end of the arm portion 91.

<Assembling Method and Connection Method of Connector>

First, the body-side sealing portion 50 is mounted on the outer peripheral surface of the terminal accommodating portion 21 and the detection-side sealing portion 80 is mounted on the outer peripheral surface of the mounting portion 61. Subsequently, the body-side front holder 28 is mounted on the terminal accommodating portion 21 from front and the detection-side front holder 66 is further mounted on the mounting portion 61 from front.

Then, the detector portion 60 is inserted into the guide portion 32 of the connector body 20. Subsequently, the lever 90 is mounted on the connector body 20. After the respective arm portions 91 are resiliently deformed, the respective supporting portions 33 are fit into the shaft holes 98 of the respective arm portions 91. In this way, the lever 90 is supported on the connector body 20 rotatably to an initial position and a connection position about fit positions of the respective shaft holes 98 and the respective supporting portions 33. The respective arm portions 91 are arranged to cover the upper surface of the function wall 31 and the lower surface of the lower wall of the fitting portion 22. Then, the pressing portion 96 of the upper arm portion 91 is inserted into the groove portion 68 of the detector portion 60 from above. Further, at an appropriate timing, the terminal fittings 24 are inserted into the cavities 23 of the terminal accommodating portion 21 and the detection terminal 63 is mounted into the mounting portion 61. The terminal fittings 24 are connected to the end parts of the wires 200 in advance.

When the lever 90 reaches the initial position, one end side of each arm portion 91 is arranged to project rearwardly of the connector body 20 as shown in FIG. 3. The pressing portion 96 of the lever 90 presses the contact surface 69 of the groove portion 68, whereby a rear part of the detector portion 60 is also arranged to project rearwardly of the connector body 20. The pressing portion 96 is arranged in an end part on the other side in the groove portion 68.

With the connector 10 opposed to the mating connector 100, the terminal accommodating portion 21 is fit into the receptacle 121 and the mating detector body 161 is fit into the tubular portion 62. At this time, the upper arm portion 91 of the lever 90 is arranged below the ceiling plate portion 123 and the lower arm portion 91 of the lever 90 is arranged below the lower surface of the receptacle 121. As shown in FIG. 3, a tip part of the mating detector body 161 enters the guide portion 32. Then, the respective cam followers 125 enter the entrances of the respective cam grooves 99. The lower cam follower 125 is arranged through the escaping groove 34 and the cam groove 99. In this state, the one end side of each arm portion 91 is pushed forward and the lever 90 is rotated toward the connection position. Then, the cam followers 125 of the mating connector body 120 slide on groove surfaces of the cam grooves 99 and a connecting operation of the connector body 20 and the mating connector body 120 proceeds.

Figure 2:
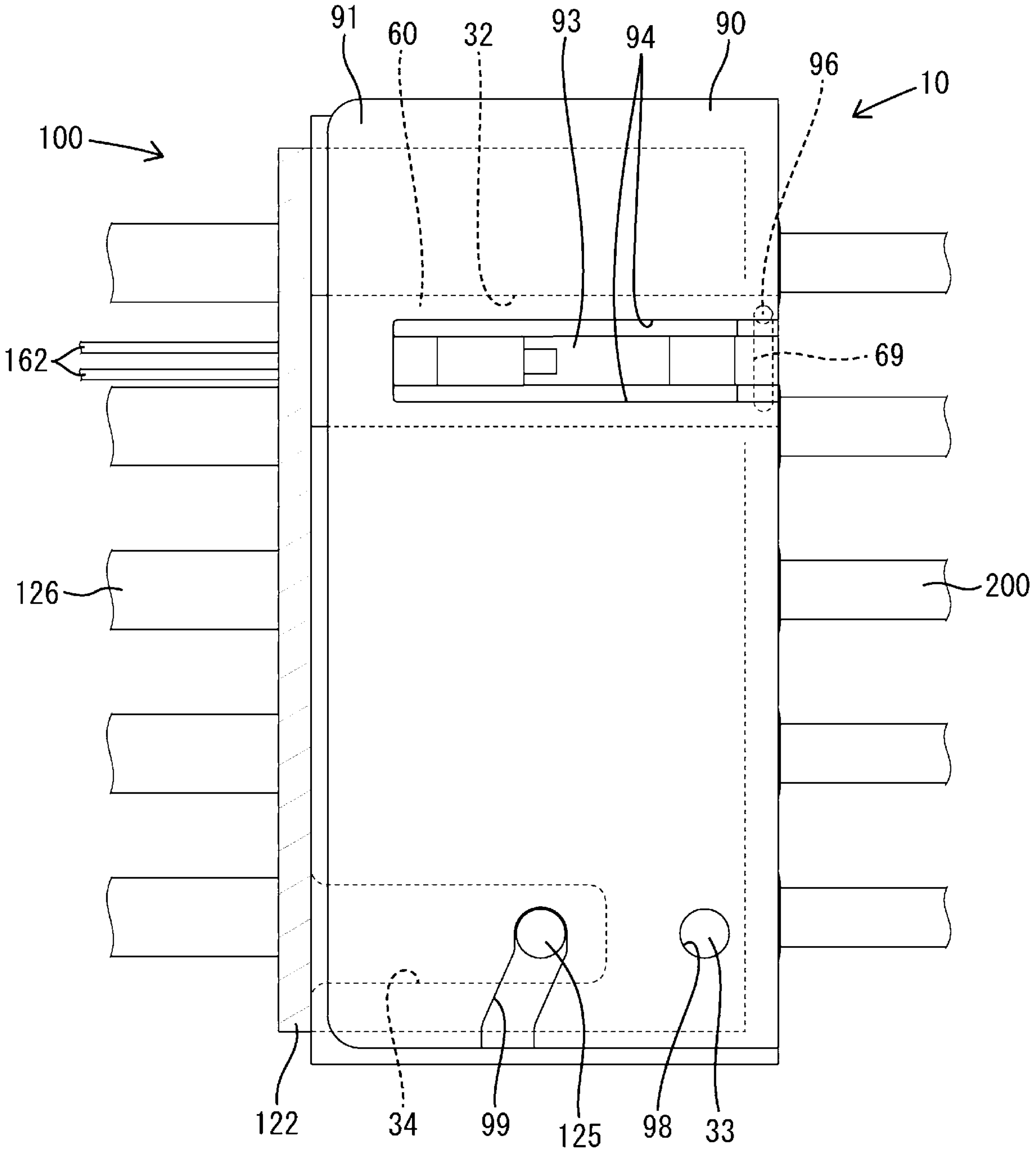
FIG. 2 is top view partly in section when the lever is at the connection position.

In the process of rotating the lever 90, the pressing portion 96 is displaced toward one side in the groove portion 68 while pressing the contact surface 69 of the groove portion 68 as shown from FIG. 3 to FIG. 2. The detector portion 60 is pressed by the pressing portion 96, thereby being displaced forward while being guided by the guide portion 32. The mating detector body 161 is inserted deeper into the tubular portion 62 of the detector portion 60. In this way, a rotational movement of the lever 90 is converted into a linear movement in the front-rear direction by which the detector portion 60 is further fit to the mating detector portion 160. That is, the contact surface 69 of the groove portion 68, the pressing portion 96 and the guide portion 32 are configured as parts serving as movement converting portions.

When the lever 90 reaches the connection position, the connector body 20 and the mating connector body 120 are properly connected to each other and the terminal fittings 24 are properly connected to the mating terminals 126 as shown in FIG. 1. Liquid-tight sealing is provided between the connector body 20 and the mating connector body 120 via the body-side sealing portion 50. Further, when the lever 90 reaches the connection position, the lock projection 95 of the lock portion 93 is fit into the lock hole 124 and the connector body 20 and the mating connector body 120 are held in the connected state.

As the lock projection 95 of the lock portion 93 is fit into the lock hole 124, the detector portion 60 located near the lock portion 93 is also properly fit to the mating detector portion 160. Simultaneously, the respective contact pieces 64 of the detection terminal 63 contact the mating detection terminals 162 to close a detection circuit. In this way, it can be electrically detected that the lever 90 has reached the connection position and, consequently, the connector body 20 and the mating connector body 120 are properly connected. Further, liquid-tight sealing is provided between the detector portion 60 and the mating detector portion 160 via the detection-side sealing portion 80.

In separating the connector 10, the lever 90 is rotated from the connection position to the initial position. Then, the pressing portion 96 presses the rear surface of the groove portion 69 on a side opposite to the contact surface 69, whereby the detector portion 60 can be displaced rearward while being guided by the guide portion 32 and return to the initial position.

As described above, according to this embodiment, the detector portion 60 is fit to the mating detector portion 160 when the lever 90 is at the connection position. Thus, by electrically detecting that state, it can be judged that the connector body 20 and the mating connector body 120 are in a properly connected state. Further, liquid-tight sealing is provided between the detector portion 60 and the mating detector portion 160 via the detection-side sealing portion 80.

The movement converting portions such as the contact surface 69 of the groove portion 68 and the pressing portion 96 convert a rotational movement of the lever 90 into a linear movement of the detector portion 60 with respect to the mating detector portion 160. Thus, the detector portion 60 can be suitably fit to the mating detector portion 160. Particularly, a movement conversion can be realized by a simple configuration composed of the pressing portion 96 and the contact surface 69. Further, liquid-tight sealing is also provided between the connector body 20 and the mating connector body 120 by the body-side sealing portion 50 separate from the detection-side sealing portion 80. As a result, the entire connector 10 can be waterproofed.

[Other Embodiments of Present Disclosure]

The embodiment disclosed this time should be considered illustrative in all aspects, rather than restrictive.

Although the detection-side sealing portion is mounted on the side of the detector portion in the case of the above embodiment, the detection-side sealing portion may be mounted on the side of the mating detector portion according to another embodiment. Similarly, the body-side sealing portion may be mounted on the side of the mating connector body.

Although the mating detector body is fit into the tubular portion of the detector portion in the case of the above embodiment, the detector portion may not include the tubular portion and the detector portion may be fit into the mating detector body according to another embodiment.

Although the connected state of the detector portion to the mating detector portion is electrically detected in the case of the above embodiment, the connected state of the detector portion to the mating detector portion may be mechanically detected based on a shape change or the like according to another embodiment.

Although the contact surface is the front surface of the groove portion in the above embodiment, the detector portion may not include the groove portion and the contact surface may be, for example, the rear surface of the detector portion according to another embodiment. Alternatively, the lever may be provided with a groove portion and the detector portion may be provided with a pin-shaped member to be inserted into the groove portion. If the lever is provided with the groove portion, a groove surface of the groove portion functions as a pressing portion.

Although the pressing portion is pin-shaped in the case of the above embodiment, the pressing portion may be, for example, shaped to have a flat surface such as in the form of a wall or plate according to another embodiment.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

a connector body connectable to a mating connector body;

a lever rotatably supported on the connector body, the lever properly connecting the connector body and the mating connector body at a connection position;

a detector portion separate from the connector body, the detector portion being fit to a mating detector portion when the lever is at the connection position; and a detection-side sealing portion to be liquid-tightly arranged between the detector portion and the mating detector portion, the detector portion and the lever including movement converting portions for converting a rotational movement of the lever into a linear movement of the detector portion with respect to the mating detector portion by contacting each other.

2. The connector of claim 1, wherein the movement converting portions are provided on a pressing portion provided on the lever and the detector portion and include a contact surface to be pressed toward the mating detector portion by the pressing portion.

3. The connector of claim 1, comprising a body-side sealing portion to be liquid-tightly arranged between the connector body and the mating connector body, separately from the detection-side sealing portion.

* * * * *